United States Patent
Thomas et al.

(10) Patent No.: US 12,543,172 B2
(45) Date of Patent: Feb. 3, 2026

(54) SYSTEMS AND METHODS FOR ACCESS NETWORK CONTROL CHANNELS BASED ON NETWORK SLICE REQUIREMENTS

(71) Applicant: Verizon Patent and Licensing Inc., Basking Ridge, NJ (US)

(72) Inventors: Mathew Thomas, Madison, NJ (US); Sachin Vargantwar, Cumming, GA (US); Chin Chiu, Allen, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 543 days.

(21) Appl. No.: 18/065,075

(22) Filed: Dec. 13, 2022

(65) Prior Publication Data

US 2024/0196391 A1    Jun. 13, 2024

(51) Int. Cl.
*H04W 72/1268* (2023.01)
*H04W 24/08* (2009.01)
*H04W 72/52* (2023.01)
*H04W 72/566* (2023.01)

(52) U.S. Cl.
CPC ....... *H04W 72/1268* (2013.01); *H04W 24/08* (2013.01); *H04W 72/52* (2023.01); *H04W 72/566* (2023.01)

(58) Field of Classification Search
CPC . H04W 72/1268; H04W 24/08; H04W 72/52; H04W 72/566
See application file for complete search history.

(56) References Cited

U.S. PATENT DOCUMENTS

| | | | |
|---|---|---|---|
| 2020/0127907 A1* | 4/2020 | Koo | H04W 24/02 |
| 2021/0029718 A1* | 1/2021 | John Wilson | H04W 72/542 |
| 2022/0256636 A1* | 8/2022 | Dutta | H04L 5/0048 |
| 2022/0338100 A1* | 10/2022 | Li | H04W 48/06 |
| 2023/0113942 A1* | 4/2023 | Wang | H04W 24/08 370/252 |
| 2024/0205915 A1* | 6/2024 | Esswie | H04W 76/19 |

FOREIGN PATENT DOCUMENTS

WO    WO-2021207900 A1 *  10/2021    ............ H04W 72/23

* cited by examiner

*Primary Examiner* — Sujoy K Kundu
*Assistant Examiner* — Raul Rivas

(57) ABSTRACT

A network device may receive, from a first user device, a first request for receiving a first service from a network, and may receive the first service from a first network slice and with first service attributes. The network device may provide the first service to the first user device with the first service attributes managed via control channels, and may receive, from a second user device, a second request for receiving a second service from the network. The network device may receive the second service from a second network slice with second service attributes, and may provide the second service to the second user device with the second service attributes via the control channels. The network device may modify, based on the first service attributes failing to satisfy a service attributes threshold, parameters for the control channels to prioritize the first user device over the second user device.

20 Claims, 10 Drawing Sheets

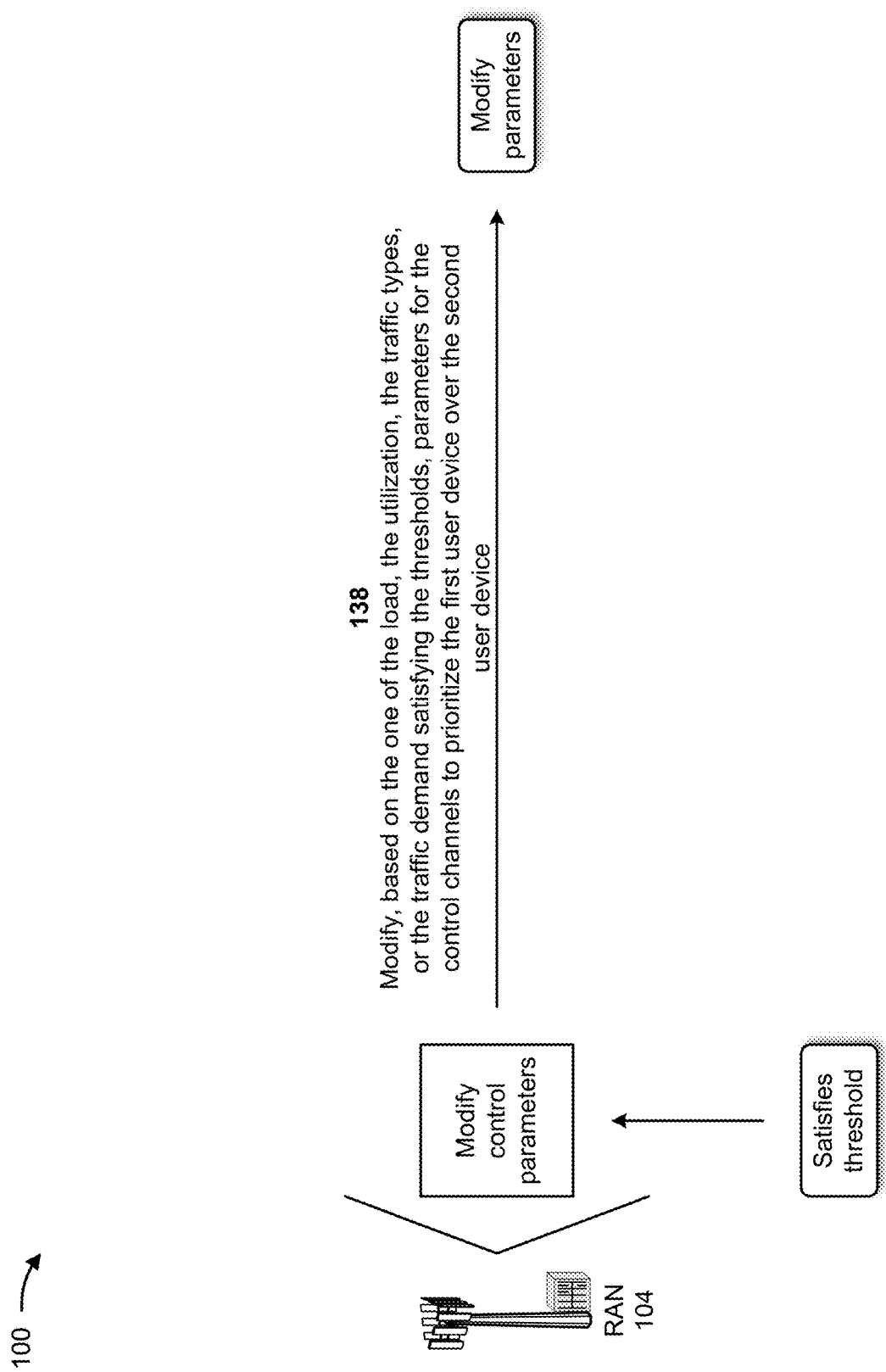

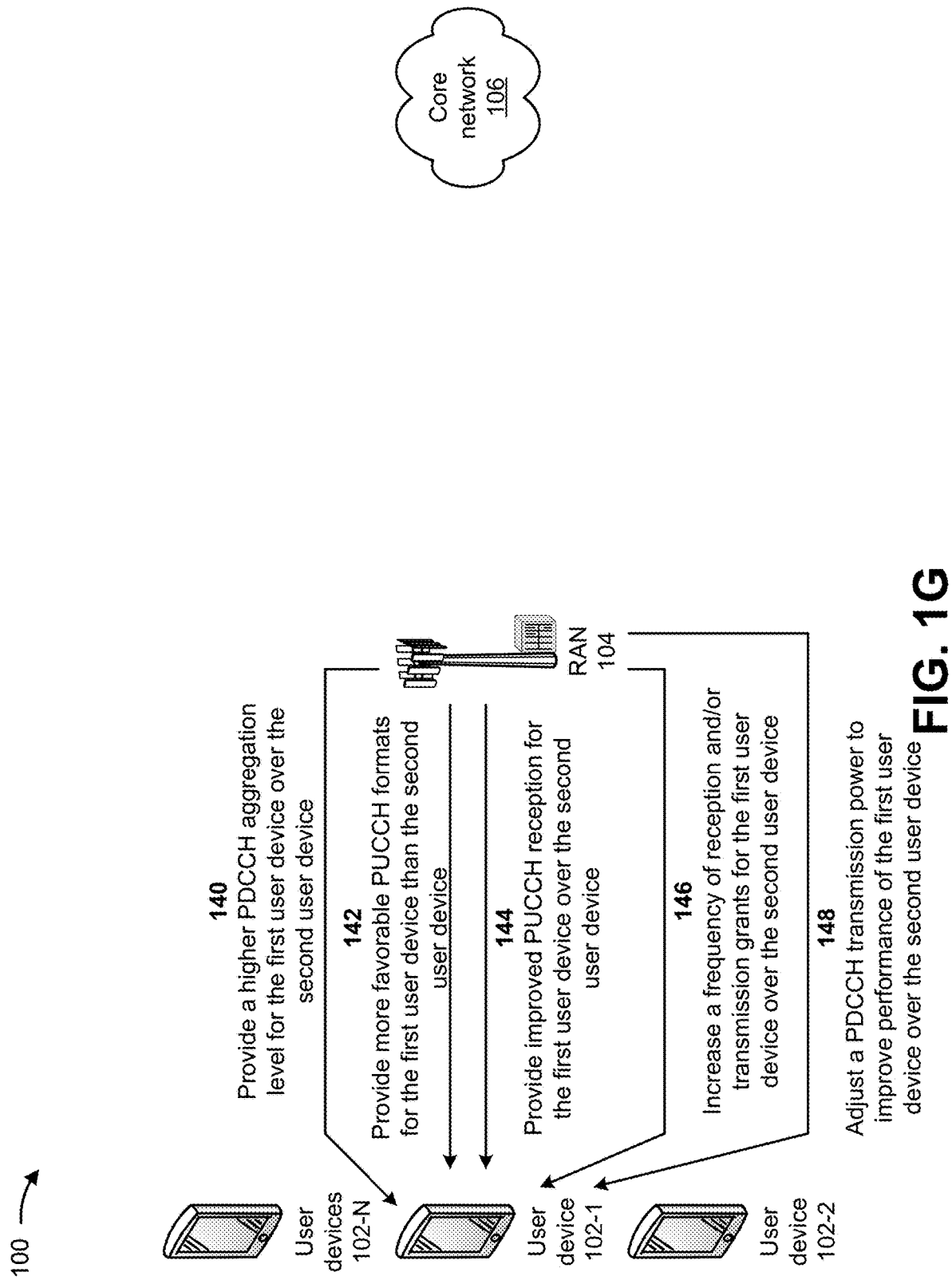

SYSTEMS AND METHODS FOR ACCESS NETWORK CONTROL CHANNELS BASED ON NETWORK SLICE REQUIREMENTS

BACKGROUND

Network slicing is a 3GPP standards supported fifth generation (5G) network configuration mechanism that enables multiple logical networks to operate over a common infrastructure in a virtualized and independent manner, to provide different end-to-end service and quality requirements as applicable to each specific service.

BRIEF DESCRIPTION OF THE DRAWINGS

FIGS. 1A-1G are diagrams of an example associated with prioritizing and managing network access control channels based on network slices requirements.

DETAILED DESCRIPTION OF EXAMPLE EMBODIMENTS

Figure 1A:
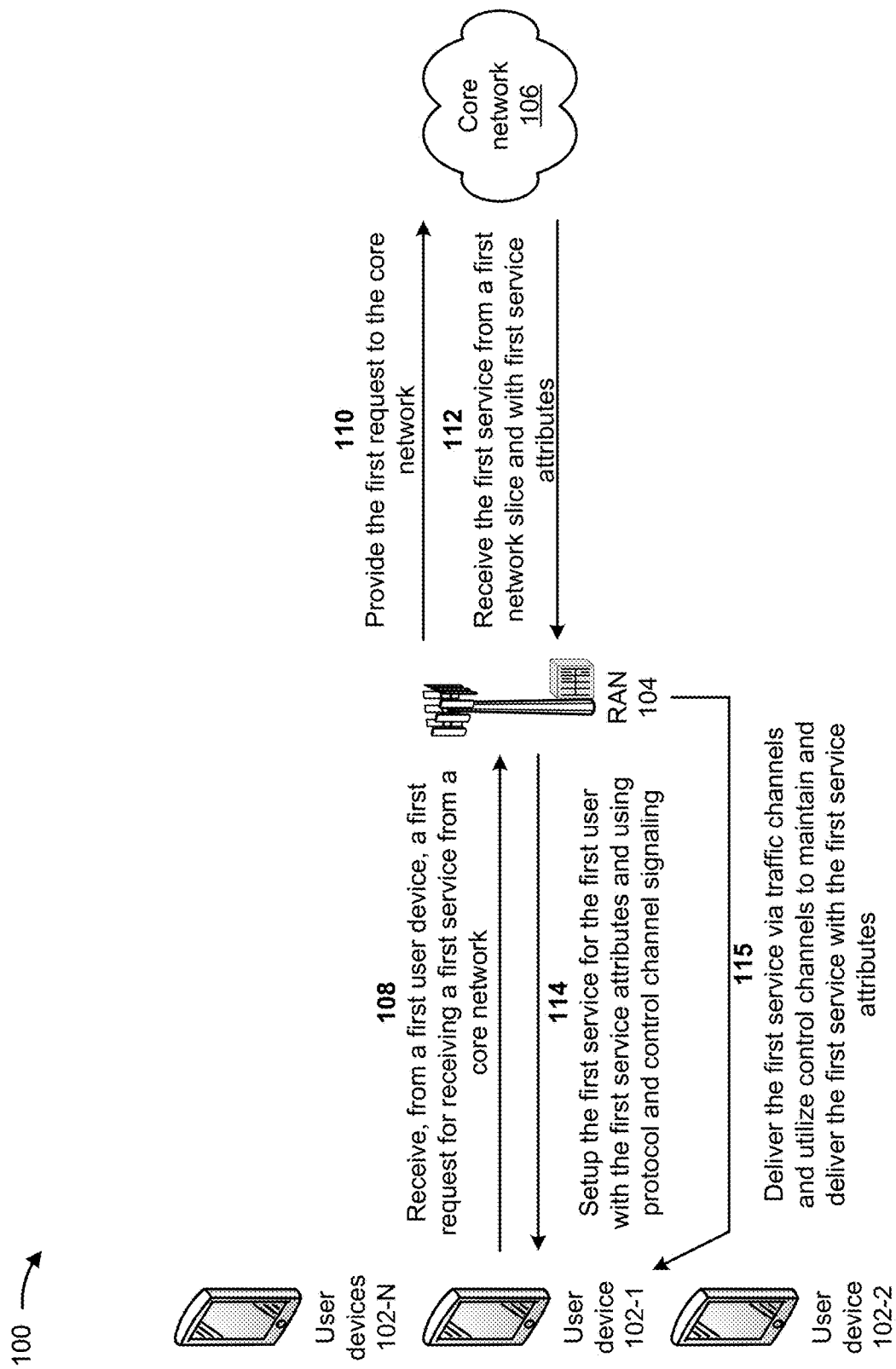

The following detailed description of example implementations refers to the accompanying drawings. The same reference numbers in different drawings may identify the same or similar elements.

Resources of a radio access network (RAN) (e.g., traffic and control channels provided by the RAN, such as a physical downlink shared and control channels (PDSCH and PDCCH) and a physical uplink shared and control channels (PUSCH and PUCCH)) may be reviewed for service attributes (e.g., quality of service (QOS) and similar attributes). The service attributes may apply to traffic and/or shared channel and resources. Control aspects need to work in a coherent manner to support the service attributes imposed on traffic resources. In order for the RAN to work within network slice requirements, the RAN must be able to allocate resources accordingly for individual user devices based on the network slice requirements. The control channels make use of RAN resources. Users may directly compete for traffic and/or shared resources and the RAN needs to determine how to utilize available control channel resources to support the users and their service attributes in a consistent manner. However, when multiple user devices are competing for the control channel RAN resources, the RAN may be unable to prioritize the user devices during heavy load conditions, heavy traffic demand, mixed traffic types, and/or the like. Thus, current mechanisms for prioritizing user devices based on network slice requirements consume computing resources (e.g., processing resources, memory resources, communication resources, and/or the like), networking resources, and/or other resources associated with failing to prioritize user devices based on network slice requirements (e.g., QoS requirements), providing poor user experiences for user devices not prioritized based on network slice requirements, handling lost traffic for user devices not prioritized based on network slice requirements, attempting to recover the lost traffic, and/or the like.

Some implementations described herein provide a network device (e.g., a RAN or in a RAN) that prioritizes and manages network access control channels based on network slices requirements. For example, the RAN may receive, from a first user device, a first request for receiving a first service from a core network, and may provide the first request to the core network. The RAN may receive the first service from a first network slice with first service attributes, and may provide the first service to the first user device with the first service attributes via one or more control channels. The RAN may receive, from a second user device, a second request for receiving a second service from the core network, and may provide the second request to the core network. The RAN may receive the second service from a second network slice with second service attributes that are different than the first service attributes, and may provide the second service to the second user device with the second service attributes via the one or more control channels. The RAN may monitor a load on the network device, a utilization of the network device, traffic types processed by the network device, a traffic demand on the network device, and service attributes to be provided by the network device, and may determine whether the first service attributes satisfy a service attributes threshold. When the first service attributes fail to satisfy the service attributes threshold, the RAN may modify one or more parameters for the one or more control channels to prioritize the first user device over the second user device. The RAN may maintain one or more parameters for the one or more control channels when the first service attributes satisfy the service attributes threshold.

In this way, the RAN prioritizes and manages network access control channels based on network slices requirements. For example, when network slicing is active, the RAN may allocate higher priorities to user devices active on higher QoS network slices than priorities allocated to user devices active on lower QoS network slices. The RAN may handle the prioritization of the user devices such that associated traffic channels and/or bearers are provided sufficient priority from a scheduling perspective. In order for this to be effective, the RAN may prioritize the control channels (e.g., the PDCCH and the PUCCH) between for the user devices. Thus, the RAN may conserve computing resources, networking resources, and/or other resources that would otherwise have been consumed by failing to prioritize user devices based on network slice requirements (e.g., QoS requirements), providing poor user experiences for user devices not prioritized based on network slice requirements, handling lost traffic for user devices not prioritized based on network slice requirements, attempting to recover the lost traffic, and/or the like.

FIGS. 1A-1G are diagrams of an example 100 associated with prioritizing and managing network access control channels based on network slices requirements. As shown in FIGS. 1A-1G, example 100 includes a first user device 102-1, a second user device 102-2, other user devices 102-N, a radio access network (RAN) 104, and a core network 106. Further details of the user devices 102, the RAN 104, and the core network 106 are provided elsewhere herein. Although only a three user devices 102 are depicted in FIG. 1A, in some implementations more than three user devices 102 may be associated with the RAN 104 and the core network 106.

As further shown in FIG. 1A, and by reference number 108, the RAN 104 may receive, from the first user device 102-1, a first request for receiving a first service from the core network 106. For example, the first user device 102-1 may be connected to the RAN 104 and a user of the first user device 102-1 may wish to receive the first service provided by the core network 106, via the RAN 104. The user may cause the first user device 102-1 to generate the first request for receiving the first service, and the first user device 102-1 may provide the first request for receiving the first service to the RAN 104. The RAN 104 may receive the first request from the first user device 102-1.

As further shown in FIG. 1A, and by reference number 110, the RAN 104 may provide the first request to the core network 106. For example, the RAN 104 may provide the first request to the core network 106, and the core network 106 may receive the first request. The core network 106 may allocate a first network slice, for providing the first service, based on receiving the first request.

As further shown in FIG. 1A, and by reference number 112, the RAN 104 may receive the first service from a first network slice and with first service attributes. For example, the core network 106 may utilize the first network slice to provide the first service to the first user device 102-1, via the RAN 104. The first network slice may be associated with a first service attributes for provision of the first service (e.g., a QoS for provision of a streaming media service, a priority of the first service over other services). The core network 106 may utilize the first network slice to provide the first service to the RAN 104, and the RAN 104 may receive the first service from the first network slice.

As further shown in FIG. 1A, and by reference number 114, the RAN 104 may setup the first service for the first user device 102-1 with the first service attributes and using protocol and control channel signaling. For example, the RAN 104 may analyze the first service attributes required for the first network slice, and may determine parameters for the control channels (e.g., the PDCCH and the PUCCH) of the RAN 104. The parameters may ensure that the control channels of the RAN 104 are setup to provide the first service to the first user device 102-1 with the first service attributes. In some implementations, the RAN 104 may utilize the control channels to provide the first service to the first user device 102-1 with the first service attributes.

As further shown in FIG. 1A, and by reference number 115, the RAN 104 may deliver the first service via traffic channels and may utilize control channels to maintain and deliver the first service with the first service attributes. For example, the RAN 104 may utilize parameters determined for the traffic channels to deliver the first service to the first user device 102-1 via the traffic channels. The RAN 104 may utilize the parameters determined for the control channels (e.g., the PDCCH and the PUCCH) of the RAN 104 to maintain and deliver the first service with the first service attributes to the first user device 102-1.

Figure 1B:
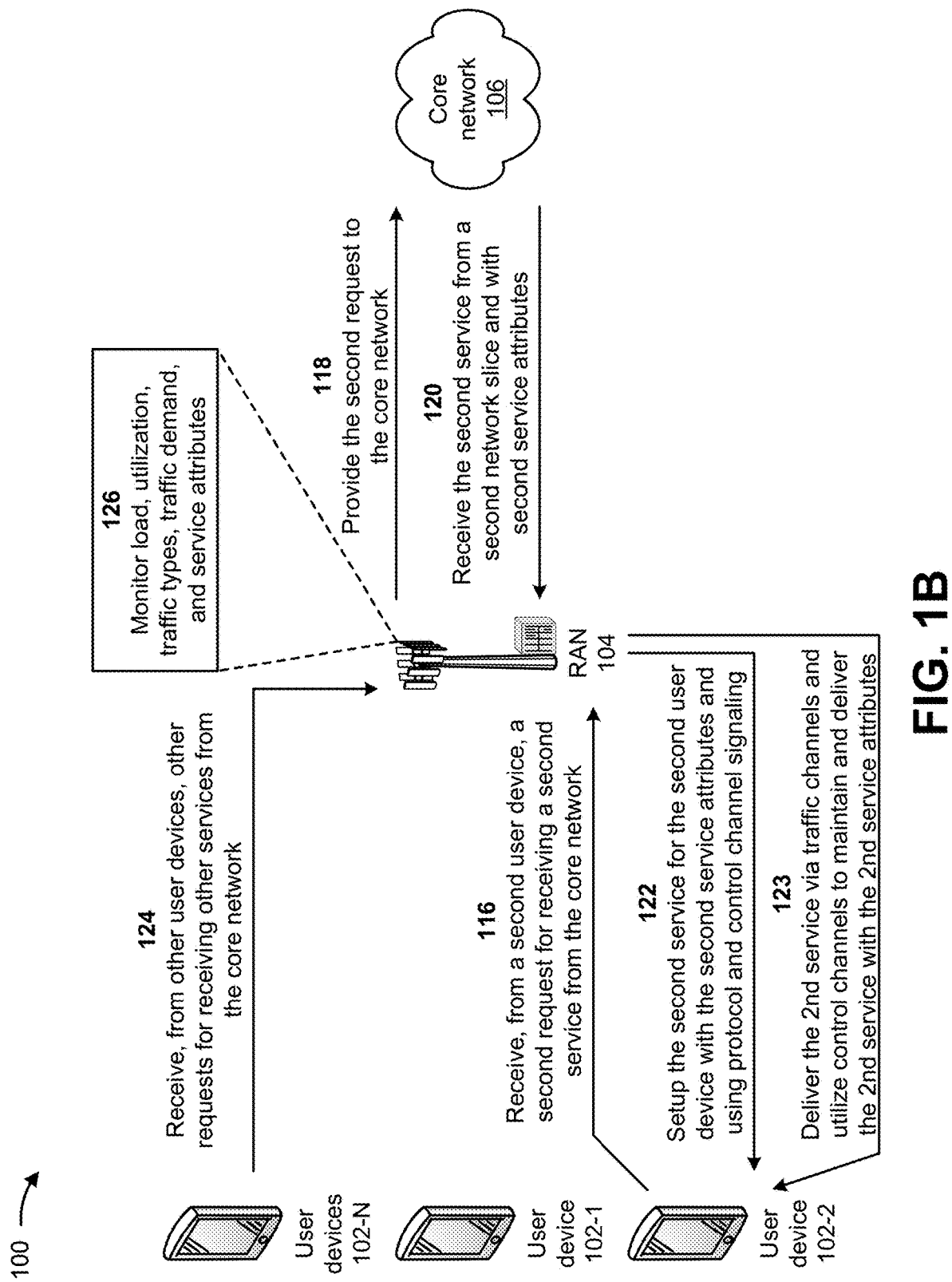

As shown in FIG. 1B, and by reference number 116, the RAN 104 may receive, from the second user device 102-2, a second request for receiving a second service from the core network 106. For example, the second user device 102-2 may be connected to the RAN 104, and a user of the second user device 102-2 may wish to receive the second service provided by the core network 106, via the RAN 104. The user may cause the second user device 102-2 to generate the second request for receiving the second service, and the second user device 102-2 may provide the second request for receiving the second service to the RAN 104. The RAN 104 may receive the second request from the second user device 102-2.

As further shown in FIG. 1B, and by reference number 118, the RAN 104 may provide the second request to the core network 106. For example, the RAN 104 may provide the second request to the core network 106, and the core network 106 may receive the second request. The core network 106 may allocate a second network slice, for providing the second service, based on receiving the second request.

As further shown in FIG. 1B, and by reference number 120, the RAN 104 may receive the second service from a second network slice and with second service attributes that are different than the first service attributes (e.g., the first service attributes may allot a higher priority to the first service than the second service attributes allot to the second service). For example, the core network 106 may utilize the second network slice to provide the second service to the second user device 102-2, via the RAN 104. The second network slice may be associated with the second attributes for provision of the second service (e.g., a QoS for provision of a voice-over-Internet protocol (VOIP) service, a priority associated with the second service). However, the second service attributes required for provision of the second service may be allotted a lower priority than a priority allotted by the first service attributes required for provision of the first service. The core network 106 may utilize the second network slice to provide the second service to the RAN 104, and the RAN 104 may receive the second service from the second network slice.

As further shown in FIG. 1B, and by reference number 122, the RAN 104 may setup the second service for the second user device 102-2 with the second service attributes and using protocol and control channel signaling. For example, the RAN 104 may analyze the second service attributes required for the second network slice, and may determine parameters for the control channels (e.g., the PDCCH and the PUCCH) of the RAN 104. The parameters may ensure that the control channels of the RAN 104 are setup to provide the second service to the second user device 102-2 with the second service attributes. In some implementations, the RAN 104 may utilize the control channels to provide the second service to the second user device 102-2 with the second service attributes.

As further shown in FIG. 1A, and by reference number 123, the RAN 104 may deliver the second service via the traffic channels and may utilize the control channels to maintain and deliver the second service with the second service attributes. For example, the RAN 104 may utilize parameters determined for the traffic channels to deliver the second service to the second user device 102-2 via the traffic channels. The RAN 104 may utilize the parameters determined for the control channels (e.g., the PDCCH and the PUCCH) of the RAN 104 to maintain and deliver the second service with the second service attributes to the second user device 102-2.

As further shown in FIG. 1B, and by reference number 124, the RAN 104 may receive, from the other user devices 102-N, other requests for receiving other services from the core network 106. For example, the other user devices 102-N may be connected to the RAN 104 and users of the other user devices 102-N may wish to receive the other services provided by the core network 106, via the RAN 104. The users may cause the other user devices 102-N to generate requests for receiving the other services, and the other user devices 102-N may provide the requests for receiving the other services to the RAN 104. The RAN 104 may receive the requests from the other user devices 102-N.

The RAN 104 may provide the requests to the core network 106, and the core network 106 may receive the requests. The core network 106 may allocate other network slices, for providing the other services, based on receiving the requests. The core network 106 may utilize the other network slices to provide the other services to the other user devices 102-N, via the RAN 104. The other network slices may be associated with other service attributes for provision of the other services. The core network 106 may utilize the other network slices to provide the other services to the RAN 104, and the RAN 104 may receive the other services from the other network slices. The RAN 104 may analyze the other service attributes required for the other network slices, and may determine parameters for the control channels (e.g., the PDCCH and the PUCCH) of the RAN 104. The parameters may ensure that the control channels of the RAN 104 provide the other services to the other user devices 102-N with the other service attributes.

As further shown in FIG. 1B, and by reference number 126, the RAN 104 may monitor a load on the RAN 104, a utilization of the RAN 104, traffic types processed by the RAN 104, a traffic demand on the RAN 104, and service attributes to be provided by the RAN 104. For example, utilization of the services by the first user device 102-1, the second user device 102-2, and the other user devices 102-N, via the RAN 104, may generate a load on the RAN 104, may cause utilization of resources of the RAN 104, may cause the RAN 104 to process different traffic types, may place a traffic demand on the RAN 104, and/or the like. The RAN 104 may monitor the load on the RAN 104, the utilization of the RAN 104, the traffic types processed by the RAN 104, the traffic demand on the RAN 104, and the service attributes to be provided by the RAN 104 for the services (e.g., the first service attributes, the second service attributes, and the other service attributes). In some implementations, the RAN 104 may continuously monitor the load on the RAN 104, the utilization of the RAN 104, the traffic types processed by the RAN 104, the traffic demand on the RAN 104, and the service attributes to be provided by the RAN 104; may periodically monitor the load on the RAN 104, the utilization of the RAN 104, the traffic types processed by the RAN 104, the traffic demand on the RAN 104, and the service attributes to be provided by the RAN 104; and/or the like.

Figure 1C:
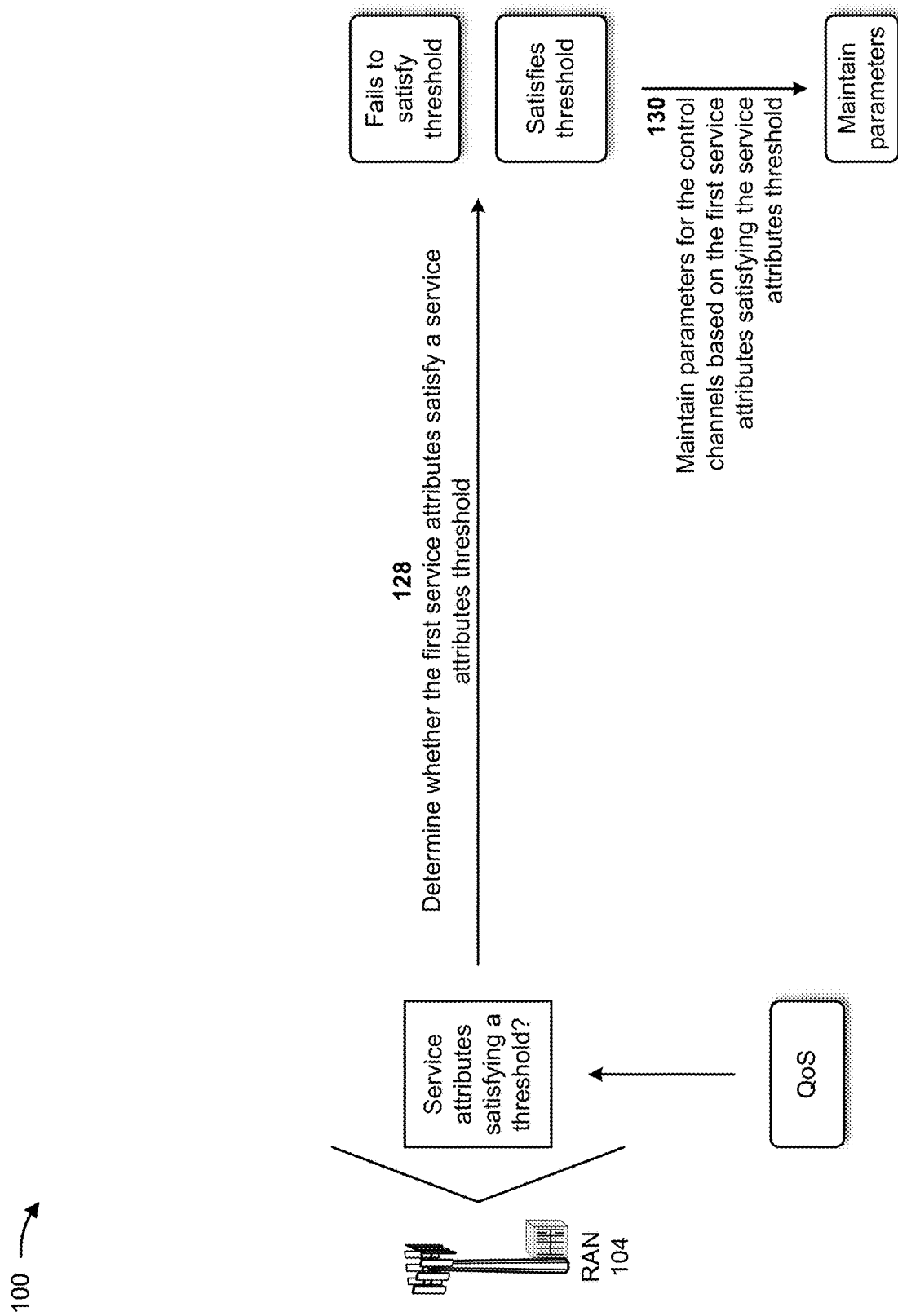

As shown in FIG. 1C, and by reference number 128, the RAN 104 may determine whether the first service attributes satisfy a service attributes threshold. For example, the core network 106 may provide one or more high priority network slices that require a higher priority service attributes than other network slices. A network slice may be considered a high priority network slice when service attributes of the network slice satisfies a service attributes threshold. The RAN 104 may determine whether the first network slice is a higher priority network slice based on determining whether the first service attributes associated with the first network slice satisfies the service attributes threshold. In some implementations, the RAN 104 may determine that the first service attributes fails to satisfy the service attributes threshold. Alternatively, the RAN 104 may determine that the first service attributes satisfy the service attributes threshold.

As further shown in FIG. 1C, and by reference number 130, the RAN 104 may maintain parameters for the control channels based on the first service attributes satisfying the service attributes threshold. For example, when the RAN 104 determines that the first service attributes satisfy the service attributes threshold, the RAN 104 may determine that the first network slice is not a high priority network slice. When the first network slice is not a high priority network slice, the RAN 104 may maintain the parameters for the control channels of the RAN 104 so that the RAN 104 may provide the first service to the first user device 102-1 with the first service attributes.

Figure 1D:
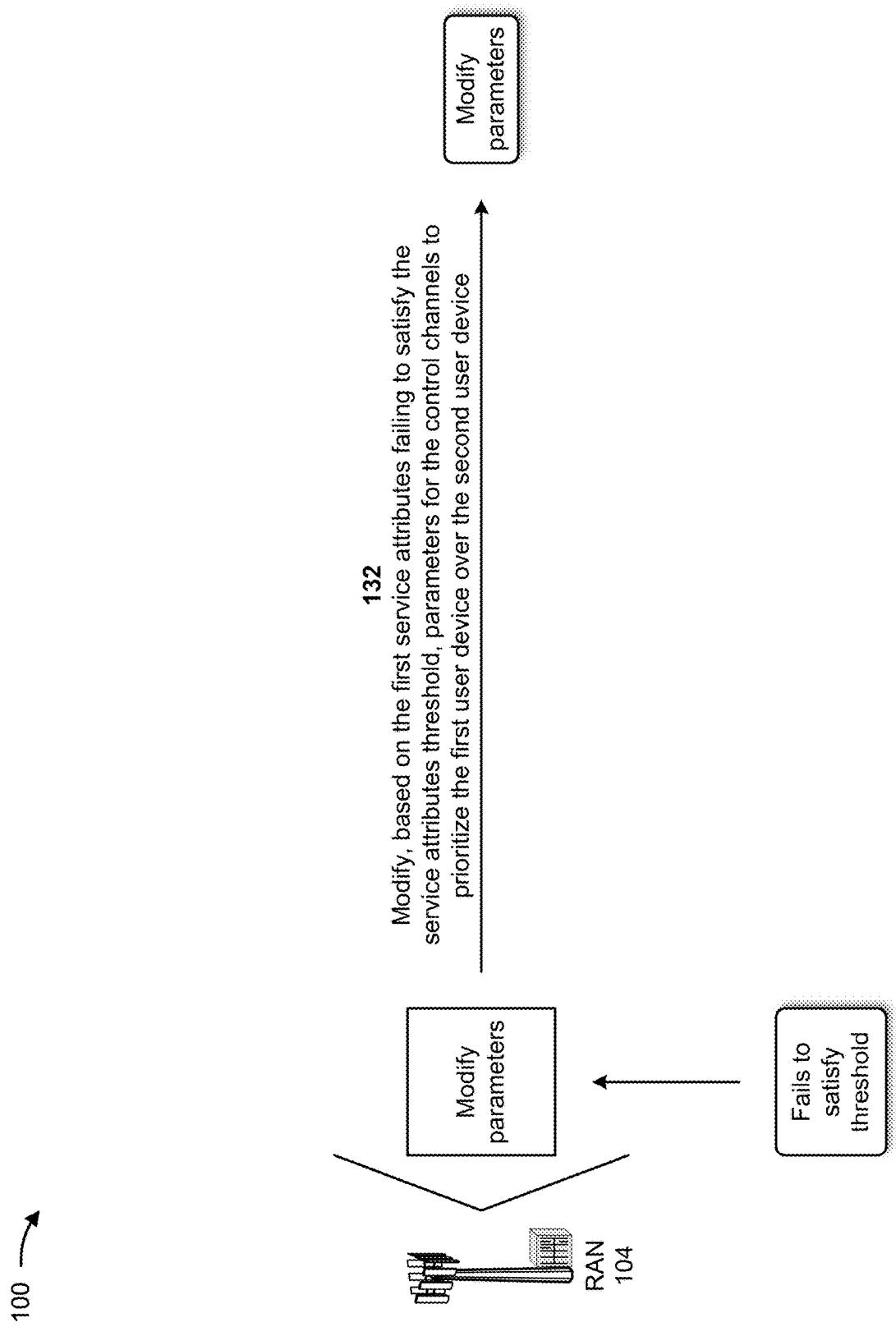

As shown in FIG. 1D, and by reference number 132, the RAN 104 may modify, based on the first service attributes failing to satisfy the service attributes threshold, one or more parameters for the control channels to prioritize the first user device 102-1 over the second user device 102-2. For example, when the RAN 104 determines that the first service attributes fails to satisfy the service attributes threshold, the RAN 104 may determine that the first network slice is a high priority network slice (e.g., that takes priority over the second network slice). When the first network slice is a high priority network slice, the RAN 104 may modify one or more parameters for the control channels of the RAN 104 to prioritize the first user device 102-1 over the second user device 102-2. Modifying the parameters may cause the RAN 104 to prioritize provision of the first service to the first user device 102-1 over provision of the second service to the second user device 102-2. Further details of modifying the one or more parameters for the control channels, to prioritize the first user device 102-1 over the second user device 102-2, are provided below in connection with FIG. 1G.

Figure 1E:
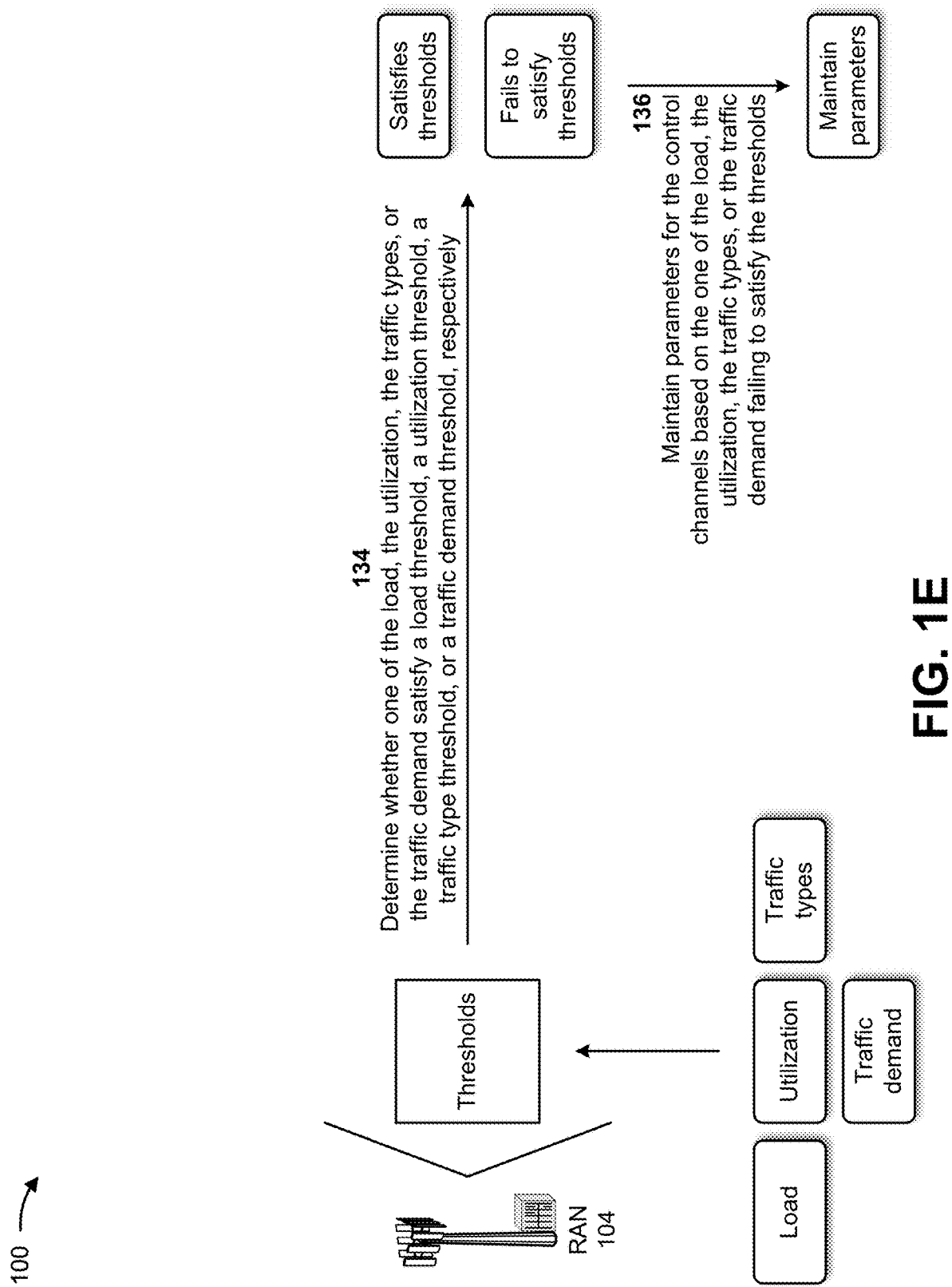

As shown in FIG. 1E, and by reference number 134, the RAN 104 may determine whether one of the load, the utilization, the traffic types, or the traffic demand satisfy a load threshold, a utilization threshold, a traffic type threshold, or a traffic demand threshold, respectively. For example, the RAN 104 may prioritize the user devices 102 when the load satisfies a load threshold (e.g., indicating that the RAN 104 is overloaded), the utilization satisfies a utilization threshold (e.g., indicating that the RAN 104 is overutilized), the traffic types satisfy a traffic type threshold (e.g., indicating that the RAN 104 is handling a large quantity of traffic types), or the traffic demand satisfies a traffic demand threshold (e.g., indicating that the traffic demand on the RAN 104 is large). Thus, the RAN 104 may determine whether one of the load, the utilization, the traffic types, or the traffic demand satisfy the load threshold, the utilization threshold, the traffic type threshold, or the traffic demand threshold, respectively. In some implementations, the RAN 104 may determine that one of the load, the utilization, the traffic types, or the traffic demand fail to satisfy the load threshold, the utilization threshold, the traffic type threshold, or the traffic demand threshold, respectively. Alternatively, the RAN 104 may determine that one of the load, the utilization, the traffic types, or the traffic demand satisfy the load threshold, the utilization threshold, the traffic type threshold, or the traffic demand threshold, respectively.

As further shown in FIG. 1E, and by reference number 136, the RAN 104 may maintain parameters for the control channels based on the one of the load, the utilization, the traffic types, or the traffic demand failing to satisfy the load threshold, the utilization threshold, the traffic type threshold, or the traffic demand threshold, respectively. For example, when the RAN 104 determines that the one of the load, the utilization, the traffic types, or the traffic demand fail to satisfy the load threshold, the utilization threshold, the traffic type threshold, or the traffic demand threshold, respectively, the RAN 104 may maintain the parameters for the control channels of the RAN 104 so that the RAN 104 may provide the first service to the first user device 102-1 with the first service attributes.

As shown in FIG. 1F, and by reference number 138, the RAN 104 may modify, based on the one of the load, the utilization, the traffic types, or the traffic demand satisfying the load threshold, the utilization threshold, the traffic type threshold, or the traffic demand threshold, respectively, one or more parameters for the control channels to prioritize the first user device over the second user device. For example, when the RAN 104 determines that the one of the load, the utilization, the traffic types, or the traffic demand satisfy the load threshold, the utilization threshold, the traffic type threshold, or the traffic demand threshold, respectively, the RAN 104 may modify one or more parameters for the control channels of the RAN 104 to prioritize the first user device 102-1 over the second user device 102-2. Modifying the parameters may cause the RAN 104 to prioritize provision of the first service to the first user device 102-1 over provision of the second service to the second user device 102-2. Further details of modifying the one or more parameters for the control channels, to prioritize the first user device 102-1 over the second user device 102-2, are provided below in connection with FIG. 1G.

As shown in FIG. 1G, and by reference number 140, the RAN 104 may provide a higher PDCCH aggregation level for the first user device 102-1 over the second user device 102-2. For example, as described above, the RAN 104 may modify the one or more parameters for the control channels of the RAN 104 when the first service attributes satisfy the service attributes threshold or when the one of the load, the utilization, the traffic types, or the traffic demand satisfy the load threshold, the utilization threshold, the traffic type threshold, or the traffic demand threshold, respectively. In some implementations, when modifying the one or more parameters for the control channels, the RAN 104 may provide a higher PDCCH aggregation level for the first user device 102-1 over the second user device 102-2 so that the first user device 102-1 is prioritized over the second user device 102-2.

As further shown in FIG. 1G, and by reference number 142, the RAN 104 may provide more favorable PUCCH formats for the first user device 102-1 than the second user device 102-2. For example, when modifying the one or more parameters for the control channels, the RAN 104 may provide more favorable PUCCH formats for the first user device 102-1 than the second user device 102-2 so that the first user device 102-1 is prioritized over the second user device 102-2.

As further shown in FIG. 1G, and by reference number 144, the RAN 104 may provide improved PUCCH reception for the first user device 102-1 over the second user device 102-2. For example, when modifying the one or more parameters for the control channels, the RAN 104 may provide improved PUCCH reception for the first user device 102-1 over the second user device 102-2 so that the first user device 102-1 is prioritized over the second user device 102-2.

As further shown in FIG. 1G, and by reference number 146, the RAN 104 may increase a frequency of reception and/or transmission grants for the first user device 102-1 over the second user device 102-2. For example, when modifying the one or more parameters for the control channels, the RAN 104 may increase a frequency of reception and/or transmission grants for the first user device 102-1 over the second user device 102-2 so that the first user device 102-1 is prioritized over the second user device 102-2.

As further shown in FIG. 1G, and by reference number 148, the RAN 104 may adjust a PDCCH transmission power to improve performance of the first user device 102-1 over the second user device 102-2. For example, when modifying the one or more parameters for the control channels, the RAN 104 may adjust PDCCH transmission power to improve performance of the first user device 102-1 over the second user device 102-2 so that the first user device 102-1 is prioritized over the second user device 102-2.

In some implementations, depending on a configured capacity of the RAN 104, higher priority user devices 102 from all or a subset of defined network slices may be selected to have control channel options adjusted to favor such user devices. In some implementations, depending on radio conditions at user devices 102 and relative network slice and/or service priorities, the RAN 104 may select control channel options that favor higher priority user devices 102 (e.g., to increase robustness, improve service quality aspects, such as latency and throughput, and/or the like).

In this way, the RAN 104 prioritizes network slices via access network control channels. For example, when network slicing is active, the RAN 104 may allocate higher priorities to user devices 102 active on higher QoS network slices than priorities allocated to user devices active on lower QoS network slices. The RAN 104 may handle the prioritization of the user devices 102 such that associated traffic channels and/or bearers are provided sufficient priority from a scheduling perspective. In order for this to be effective, the RAN 104 may prioritize the control channels (e.g., the PDCCH and the PUCCH) between for the user devices 102. Thus, the RAN 104 may conserve computing resources, networking resources, and/or other resources that would otherwise have been consumed by failing to prioritize user devices 102 based on network slice requirements (e.g., QoS requirements), providing poor user experiences for user devices 102 not prioritized based on network slice requirements, handling lost traffic for user devices 102 not prioritized based on network slice requirements, attempting to recover the lost traffic, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
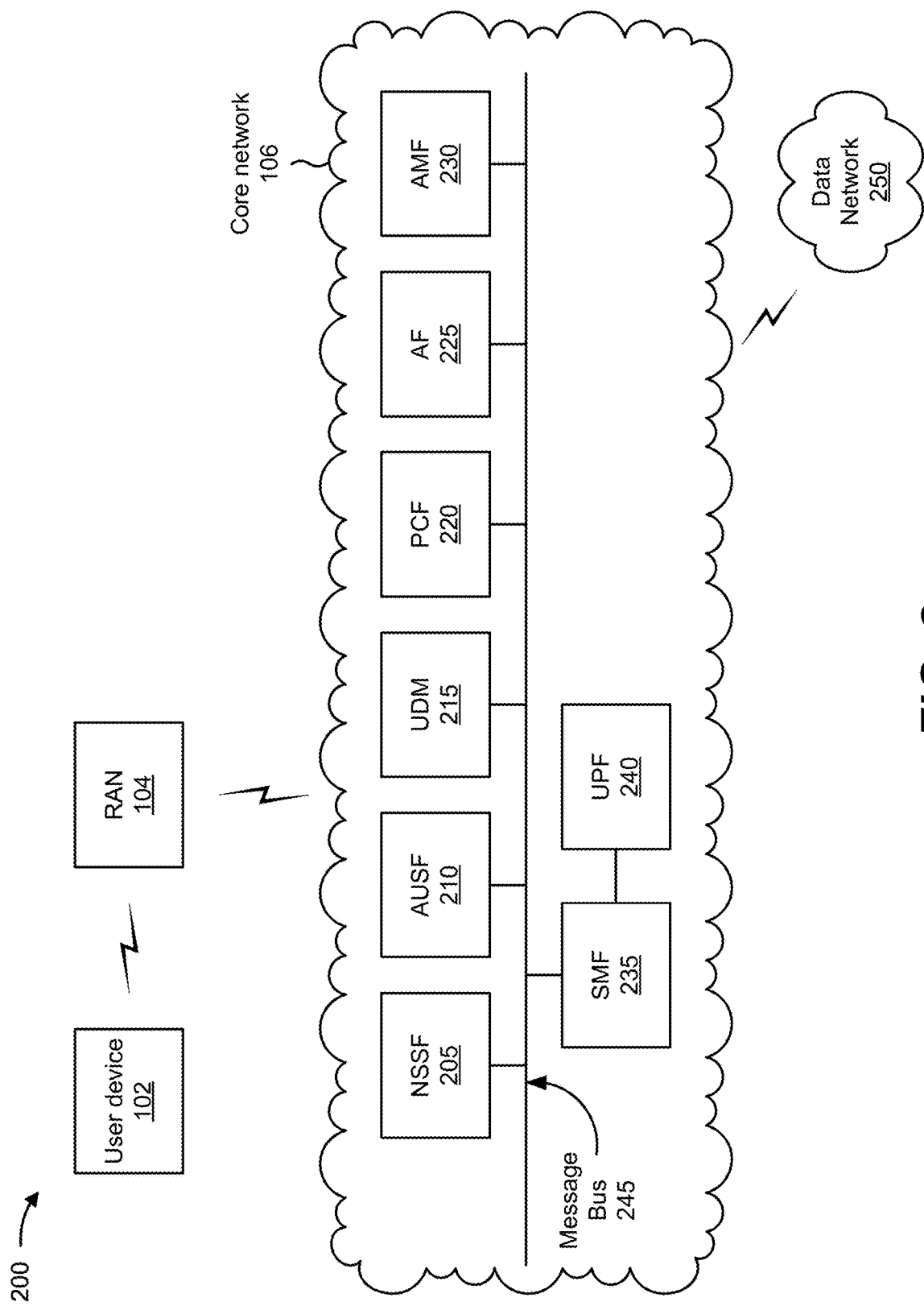
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 102, the RAN 104, the core network 106, and a data network 250. Devices and/or networks of the example environment 200 may interconnect via wired connections, wireless connections, or a combination of wired and wireless connections.

The user device 102 includes one or more devices capable of receiving, generating, storing, processing, and/or providing information, such as information described herein. For example, the user device 102 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 104 may support, for example, a cellular radio access technology (RAT). The RAN 104 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 102. The RAN 104 may transfer traffic between the user device 102 (e.g., using a cellular RAT), one or more base stations (e.g., using a wireless interface or a backhaul interface, such as a wired backhaul interface), and/or the core network 106. The RAN 104 may provide one or more cells that cover geographic areas.

In some implementations, the RAN 104 may perform scheduling and/or resource management for the user device 102 covered by the RAN 104 (e.g., the user device 102 covered by a cell provided by the RAN 104). In some implementations, the RAN 104 may be controlled or coordinated by a network controller, which may perform load balancing, network-level configuration, and/or other operations. The network controller may communicate with the RAN 104 via a wireless or wireline backhaul. In some implementations, the RAN 104 may include a network controller, a self-organizing network (SON) module or component, or a similar module or component. In other words, the RAN 104 may perform network control, scheduling, and/or network management functions (e.g., for uplink, downlink, and/or sidelink communications of the user device 102 covered by the RAN 104).

In some implementations, the core network 106 may include an example functional architecture in which systems and/or methods described herein may be implemented. For example, the core network 106 may include an example architecture of a 5G next generation (NG) core network included in a 5G wireless telecommunications system. While the example architecture of the core network 106 shown in FIG. 2 may be an example of a service-based architecture, in some implementations, the core network 106 may be implemented as a reference-point architecture and/or a 4G core network, among other examples.

As shown in FIG. 2, the core network 106 may include a number of functional elements. The functional elements may include, for example, a network slice selection function (NSSF) 205, an authentication server function (AUSF) 210, a unified data management (UDM) component 215, a policy control function (PCF) 220, an application function (AF) 225, an access and mobility management function (AMF) 230, a session management function (SMF) 235, and/or a user plane function (UPF) 240. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 102. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the user device 102 in the wireless telecommunications system.

The UDM 215 includes one or more devices that store user data and profiles in the wireless telecommunications system. The UDM 215 may be used for fixed access and/or mobile access in the core network 106.

The PCF 220 includes one or more devices that provide a policy framework that incorporates network slicing, roaming, packet processing, and/or mobility management, among other examples.

The AF 225 includes one or more devices that support application influence on traffic routing, access to a network exposure function, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment Internet protocol (IP) address allocation and policies, among other examples.

The UPF 240 includes one or more devices that serve as an anchor point for intraRAT and/or interrupt mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an Internet protocol multimedia subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
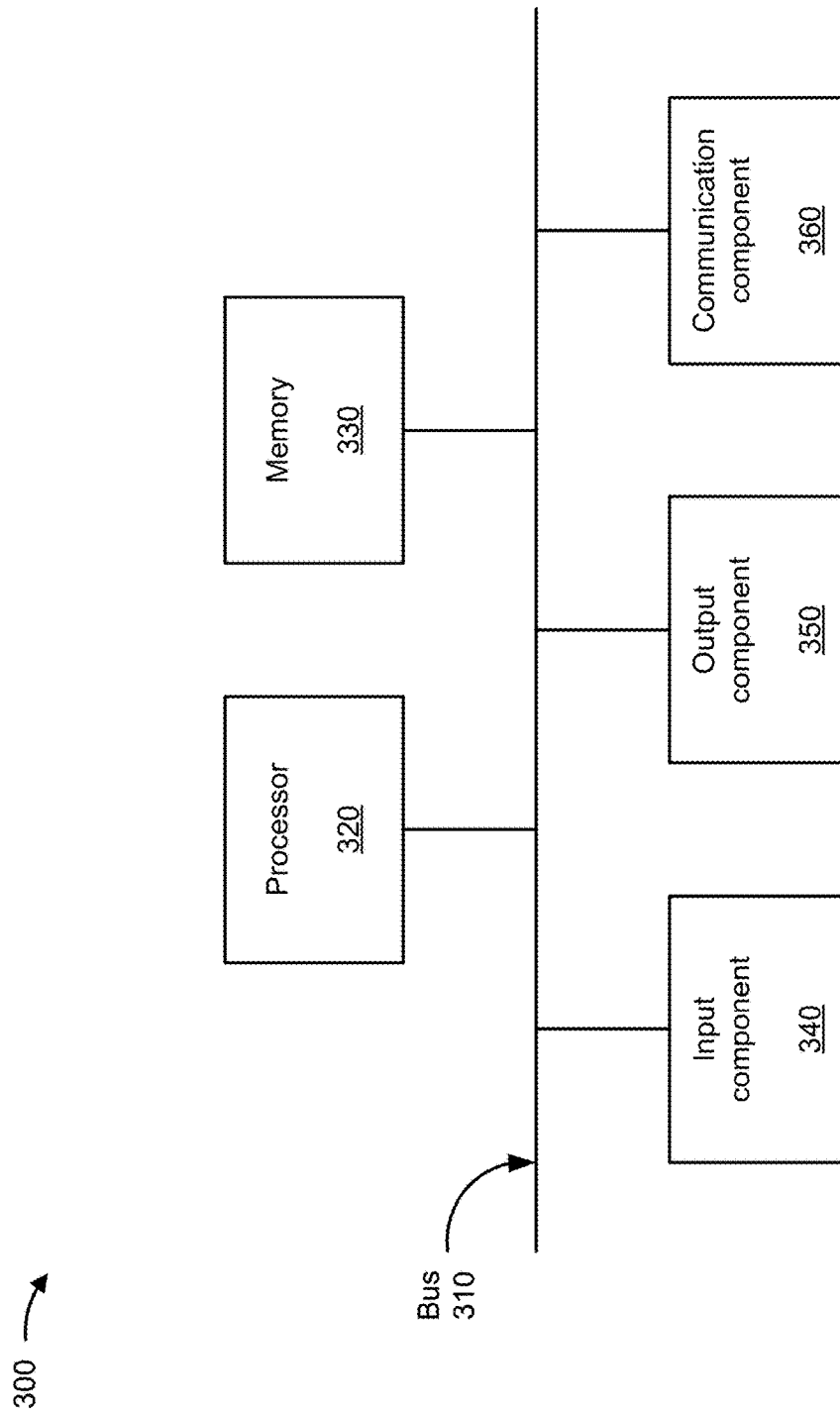
FIG. 3 is a diagram of example components of one or more devices of FIG. 2.

FIG. 3 is a diagram of example components of a device 300, which may correspond to the user device 102, the RAN 104, the NSSF 205, the AUSF 210, the UDM 215, the PCF 220, the AF 225, the AMF 230, the SMF 235, and/or the UPF 240. In some implementations, the user device 102, the RAN 104, the NSSF 205, the AUSF 210, the UDM 215, the PCF 220, the AF 225, the AMF 230, the SMF 235, and/or the UPF 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
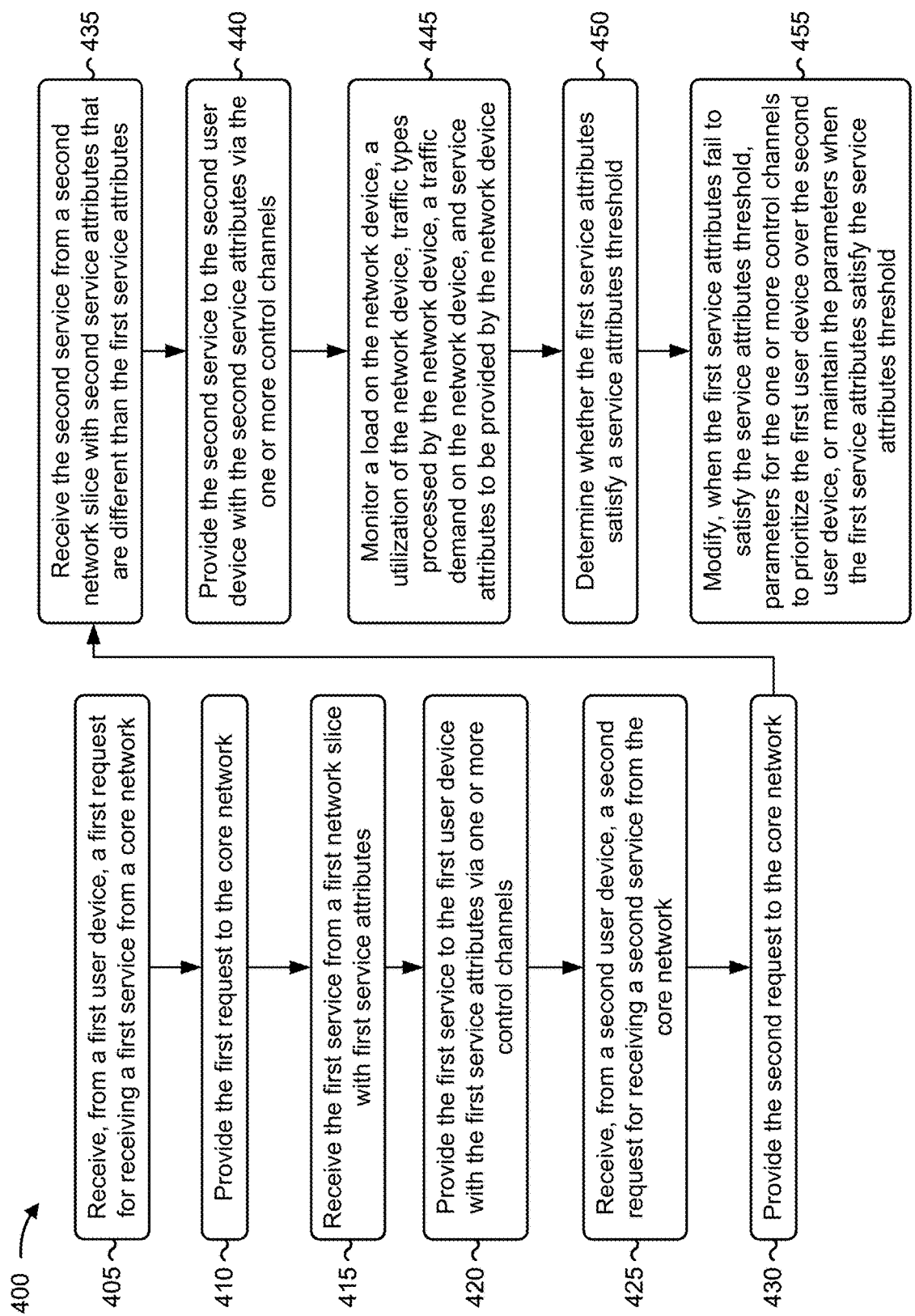
FIG. 4 is a flowchart of an example process for prioritizing and managing network access control channels based on network slices requirements.

FIG. 4 is a flowchart of an example process 400 for prioritizing and managing network access control channels based on network slices requirements. In some implementations, one or more process blocks of FIG. 4 may be performed by a network device (e.g., the RAN 104). In some implementations, one or more process blocks of FIG. 4 may be performed by another device or a group of devices separate from or including the network device, such as a network device of a core network (e.g., the core network 106). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from a first user device, a first request for receiving a first service from a core network (block 405). For example, the network device may receive, from a first user device, a first request for receiving a first service from a core network, as described above.

As further shown in FIG. 4, process 400 may include providing the first request to the core network (block 410). For example, the network device may provide the first request to the core network, as described above.

As further shown in FIG. 4, process 400 may include receiving the first service from a first network slice with first service attributes (block 415). For example, the network device may receive the first service from a first network slice with first service attributes, as described above.

As further shown in FIG. 4, process 400 may include providing the first service to the first user device with the first service attributes via one or more control channels (block 420). For example, the network device may provide the first service to the first user device with the first service attributes via one or more control channels, as described above. In some implementations, the one or more control channels include a physical downlink control channel and a physical uplink control channel.

As further shown in FIG. 4, process 400 may include receiving, from a second user device, a second request for receiving a second service from the core network (block 425). For example, the network device may receive, from a second user device, a second request for receiving a second service from the core network, as described above.

As further shown in FIG. 4, process 400 may include providing the second request to the core network (block 430). For example, the network device may provide the second request to the core network, as described above.

As further shown in FIG. 4, process 400 may include receiving the second service from a second network slice with second service attributes that are different than the first service attributes (block 435). For example, the network device may receive the second service from a second network slice with second service attributes that are different than the first service attributes, as described above.

As further shown in FIG. 4, process 400 may include providing the second service to the second user device with the second service attributes via the one or more control channels (block 440). For example, the network device may provide the second service to the second user device with the second service attributes via the one or more control channels, as described above.

As further shown in FIG. 4, process 400 may include monitoring a load on the network device, a utilization of the network device, traffic types processed by the network device, a traffic demand on the network device, and service attributes to be provided by the network device (block 445). For example, the network device may monitor a load on the network device, a utilization of the network device, traffic types processed by the network device, a traffic demand on the network device, and service attributes to be provided by the network device, as described above.

As further shown in FIG. 4, process 400 may include determining whether the first service attributes satisfy a service attributes threshold (block 450). For example, the network device may determine whether the first service attributes satisfy a service attributes threshold, as described above.

As further shown in FIG. 4, process 400 may include modifying, when the first service attributes fails to satisfy the service attributes threshold, parameters for the one or more control channels to prioritize the first user device over the second user device, or maintain the parameters when the first service attributes satisfy the service attributes threshold (block 455). For example, the network device may selectively modify, based on the first service attributes failing to satisfy the service attributes threshold, one or more parameters for the one or more control channels to prioritize the first user device over the second user device, or maintain one or more parameters for the one or more control channels based on the first service attributes satisfying the service attributes threshold, as described above.

In some implementations, modifying, based on the first service attributes failing to satisfy the service attributes threshold, the one or more parameters for the one or more control channels to prioritize the first user device over the second user device includes providing a higher physical downlink control channel aggregation level for the first user device over the second user device. In some implementations, modifying, based on the first service attributes failing to satisfy the service attributes threshold, the one or more parameters for the one or more control channels to prioritize the first user device over the second user device includes providing physical uplink control channel formats for the first user device that are different than physical uplink channel formats provided to the second user device.

In some implementations, modifying, based on the first service attributes failing to satisfy the service attributes threshold, the one or more parameters for the one or more control channels to prioritize the first user device over the second user device includes providing improved physical uplink control channel reception for the first user device over the second user device. In some implementations, modifying, based on the first service attributes failing to satisfy the service attributes threshold, the one or more parameters for the one or more control channels to prioritize the first user device over the second user device includes increasing a frequency of reception and/or transmission grants for the first user device over the second user device. In some implementations, modifying, based on the first service attributes failing to satisfy the service attributes threshold, the one or more parameters for the one or more control channels to prioritize the first user device over the second user device includes adjusting a physical downlink control channel transmission power to improve performance of the first user device over the second user device.

In some implementations, process 400 includes receiving, from other user devices, other requests for receiving other services from the core network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In some implementations, process 400 includes determining whether one of the load, the utilization, the traffic types, or the traffic demand satisfies a load threshold, a utilization threshold, a traffic type threshold, or a traffic demand threshold, respectively; and modifying, based on the one of the load, the utilization, the traffic types, or the traffic demand satisfying the load threshold, the utilization threshold, the traffic type threshold, or the traffic demand threshold, respectively, one or more parameters for the control one or more channels to prioritize the first user device over the second user device. In some implementations, process 400 includes maintaining one or more parameters for the one or more control channels based on the one of the load, the utilization, the traffic types, or the traffic demand failing to satisfy the load threshold, the utilization threshold, the traffic type threshold, or the traffic demand threshold, respectively.

In some implementations, modifying, based on the one of the load, the utilization, the traffic types, or the traffic demand satisfying the load threshold, the utilization threshold, the traffic type threshold, or the traffic demand threshold, respectively, the one or more parameters for the one or more control channels includes providing a higher physical downlink control channel aggregation level for the first user device over the second user device.

In some implementations, modifying, based on the one of the load, the utilization, the traffic types, or the traffic demand satisfying the load threshold, the utilization threshold, the traffic type threshold, or the traffic demand threshold, respectively, the one or more parameters for the one or more control channels includes providing more favorable PUCCH formats for the first user device than the second user device, or providing improved PUCCH reception for the first user device over the second user device.

In some implementations, modifying, based on the one of the load, the utilization, the traffic types, or the traffic demand satisfying the load threshold, the utilization threshold, the traffic type threshold, or the traffic demand threshold, respectively, the one or more parameters for the one or more control channels includes increasing a frequency of reception and/or transmission grants for the first user device over the second user device.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device and from a first user device, a first request for receiving a first service from a core network;
   providing, by the network device, the first request to the core network;
   receiving, by the network device, the first service from a first network slice with first service attributes;
   providing, by the network device, the first service to the first user device with the first service attributes via one or more control channels;
   receiving, by the network device and from a second user device, a second request for receiving a second service from the core network;
   providing, by the network device, the second request to the core network;
   receiving, by the network device, the second service from a second network slice with second service attributes that are different than the first service attributes;
   providing, by the network device, the second service to the second user device with the second service attributes via the one or more control channels;
   monitoring, by the network device, a load on the network device, a utilization of the network device, traffic types processed by the network device, a traffic demand on the network device, and service attributes to be provided by the network device;
   determining, by the network device, whether the first service attributes satisfy a service attributes threshold; and
   modifying, by the network device and based on the first service attributes failing to satisfy the service attributes threshold, one or more parameters for the one or more control channels to prioritize the first user device over the second user device,
      wherein modifying the one or more parameters comprises:
         adjusting a physical control channel transmission power to improve performance of the first user device over the second user device, or
         increasing a frequency of reception and/or transmission grants for the first user device over the second user device.

2. The method of claim 1,
   wherein modifying, based on the first service attributes failing to satisfy the service attributes threshold, the one or more parameters for the one or more control channels to prioritize the first user device over the second user device further comprises:
      providing a higher physical downlink control channel aggregation level for the first user device over the second user device.

3. The method of claim 1,
   wherein modifying, based on the first service attributes failing to satisfy the service attributes threshold, the one or more parameters for the one or more control channels to prioritize the first user device over the second user device further comprises:
      providing physical uplink control channel formats for the first user device that are different than physical uplink channel formats provided to the second user device.

4. The method of claim 1,
   wherein modifying, based on the first service attributes failing to satisfy the service attributes threshold, the one or more parameters for the one or more control channels to prioritize the first user device over the second user device further comprises:
      providing improved physical uplink control channel reception for the first user device over the second user device.

5. The method of claim 1, further comprising:
receiving, from other user devices, other requests for receiving other services from the core network.

6. A network device, comprising:
one or more processors configured to:
receive, from a first user device, a first request for receiving a first service from a core network;
provide the first request to the core network;
receive the first service from a first network slice and with first service attributes;
provide the first service to the first user device with the first service attributes via one or more control channels;
receive, from a second user device, a second request for receiving a second service from the core network;
provide the second request to the core network;
receive the second service from a second network slice with second service attributes that are different than the first service attributes;
provide the second service to the second user device with the second service attributes via the one or more control channels;
monitor a load on the network device, a utilization of the network device, traffic types processed by the network device, a traffic demand on the network device, and service attributes to be provided by the network device;
determine whether the first service attributes satisfy a service attributes threshold; and
modify, based on the first service attributes failing to satisfy the service attributes threshold, one or more parameters for the one or more control channels to prioritize the first user device over the second user device,
wherein the one or more processors, to modify the one or more parameters, are to:
adjust a physical control channel transmission power to improve performance of the first user device over the second user device, or
increase a frequency of reception and/or transmission grants for the first user device over the second user device.

7. The network device of claim 6, wherein the one or more control channels include a physical downlink control channel and a physical uplink control channel.

8. The network device of claim 6, wherein the one or more processors are further configured to:
determine whether one of the load, the utilization, the traffic types, or the traffic demand satisfies a load threshold, a utilization threshold, a traffic type threshold, or a traffic demand threshold, respectively; and
modify, based on the one of the load, the utilization, the traffic types, or the traffic demand satisfying the load threshold, the utilization threshold, the traffic type threshold, or the traffic demand threshold, respectively, one or more parameters for the control one or more channels to prioritize the first user device over the second user device.

9. The network device of claim 8, wherein the one or more processors are further configured to:
maintain one or more parameters for the one or more control channels based on the one of the load, the utilization, the traffic types, or the traffic demand failing to satisfy the load threshold, the utilization threshold, the traffic type threshold, or the traffic demand threshold, respectively.

10. The network device of claim 8, wherein the one or more processors, to modify, based on the one of the load, the utilization, the traffic types, or the traffic demand satisfying the load threshold, the utilization threshold, the traffic type threshold, or the traffic demand threshold, respectively, the one or more parameters for the one or more control channels, are configured to:
provide a higher physical downlink control channel aggregation level for the first user device over the second user device.

11. The network device of claim 8, wherein the one or more processors, to modify, based on the one of the load, the utilization, the traffic types, or the traffic demand satisfying the load threshold, the utilization threshold, the traffic type threshold, or the traffic demand threshold, respectively, the one or more parameters for the one or more control channels, are configured to one or more of:
provide more favorable physical uplink control channel (PUCCH) formats for the first user device than the second user device; or
provide improved PUCCH reception for the first user device over the second user device.

12. A non-transitory computer-readable medium storing a set of instructions, the set of instructions comprising:
one or more instructions that, when executed by one or more processors of a network device, cause the network device to:
receive, from a first user device, a first request for receiving a first service from a core network;
provide the first request to the core network;
receive the first service from a first network slice and with first service attributes;
provide the first service to the first user device with the first service attributes via one or more control channels;
receive, from a second user device, a second request for receiving a second service from the core network;
provide the second request to the core network;
receive the second service from a second network slice and with second service attributes that are different than the first service attributes;
provide the second service to the second user device with the second service attributes via the one or more control channels;
receive, from other user devices, other requests for receiving other services from the core network;
monitor a load on the network device, a utilization of the network device, traffic types processed by the network device, a traffic demand on the network device, and service attributes to be provided by the network device;
determine whether the first service attributes satisfy a service attributes threshold; and
modify, based on the first service attributes failing to satisfy the service attributes threshold, one or more parameters for the one or more control channels to prioritize the first user device over the second user device,
wherein the one or more instructions, that cause the network device to modify, the one or more parameters, cause the network device to one or more of:
adjust a physical control channel transmission power to improve performance of the first user device over the second user device, or
increase a frequency of reception and/or transmission grants for the first user device over the second user device.

13. The non-transitory computer-readable medium of claim 12, wherein the one or more instructions, that cause the network device to modify, based on the first service attributes failing to satisfy the service attributes threshold, the one or more parameters for the one or more control channels to prioritize the first user device over the second user device, cause the network device to one or more of:
provide a higher physical downlink control channel aggregation level for the first user device over the second user device; or
provide more favorable physical uplink control channel formats for the first user device than the second user device.

14. The non-transitory computer-readable medium of claim 12, wherein the one or more instructions, that cause the network device to modify, based on the first service attributes failing to satisfy the service attributes threshold, the one or more parameters for the one or more control channels to prioritize the first user device over the second user device, cause the network device to:
provide improved physical uplink control channel reception for the first user device over the second user device.

15. The non-transitory computer-readable medium of claim 12, wherein the one or more instructions further cause the network device to:
determine whether one of the load, the utilization, the traffic types, or the traffic demand satisfies a load threshold, a utilization threshold, a traffic type threshold, or a traffic demand threshold, respectively; and
selectively:
modify, based on the one of the load, the utilization, the traffic types, or the traffic demand satisfying the load threshold, the utilization threshold, the traffic type threshold, or the traffic demand threshold, respectively, one or more parameters for the one or more control channels to prioritize the first user device over the second user device; or
maintain one or more parameters for the one or more control channels based on the one of the load, the utilization, the traffic types, or the traffic demand failing to satisfy the load threshold, the utilization threshold, the traffic type threshold, or the traffic demand threshold, respectively.

16. The non-transitory computer-readable medium of claim 15, wherein the one or more instructions, that cause the network device to modify, based on the one of the load, the utilization, the traffic types, or the traffic demand satisfying the load threshold, the utilization threshold, the traffic type threshold, or the traffic demand threshold, respectively, the one or more parameters for the one or more control channels, cause the network device to:
provide a higher physical downlink control channel aggregation level for the first user device over the second user device.

17. The non-transitory computer-readable medium of claim 15, wherein the one or more instructions, that cause the network device to modify, based on the one of the load, the utilization, the traffic types, or the traffic demand satisfying the load threshold, the utilization threshold, the traffic type threshold, or the traffic demand threshold, respectively, the one or more parameters for the one or more control channels, cause the network device to one or more of:
provide more favorable physical uplink control channel (PUCCH) formats for the first user device than the second user device; or
provide improved PUCCH reception for the first user device over the second user device.

18. The method of claim 1, further comprising:
determining whether one of the load, the utilization, the traffic types, or the traffic demand satisfies a load threshold, a utilization threshold, a traffic type threshold, or a traffic demand threshold, respectively; and
modifying, based on the one of the load, the utilization, the traffic types, or the traffic demand satisfying the load threshold, the utilization threshold, the traffic type threshold, or the traffic demand threshold, respectively, one or more parameters for the control one or more channels to prioritize the first user device over the second user device.

19. The method of claim 18, wherein modifying, based on the one of the load, the utilization, the traffic types, or the traffic demand satisfying the load threshold, the utilization threshold, the traffic type threshold, or the traffic demand threshold, respectively, the one or more parameters for the one or more control channels, comprises:
providing more favorable physical uplink control channel (PUCCH) formats for the first user device than the second user device; or
providing improved PUCCH reception for the first user device over the second user device.

20. The network device of claim 8, wherein the one or more processors are further configured to:
receive, from other user devices, other requests for receiving other services from the core network.

* * * * *